(12) United States Patent
Sakamoto et al.

(10) Patent No.: US 7,603,298 B2
(45) Date of Patent: Oct. 13, 2009

(54) TAG GROUPING SYSTEM AND TAG GROUPING METHOD

(75) Inventors: Kenji Sakamoto, Chiyoda-ku (JP); Goro Kunito, Chiyoda-ku (JP); Kenichi Yamazaki, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 931 days.

(21) Appl. No.: 10/775,129

(22) Filed: Feb. 11, 2004

(65) Prior Publication Data

US 2004/0178911 A1 Sep. 16, 2004

(30) Foreign Application Priority Data

Feb. 25, 2003 (JP) .............................. 2003-048041

(51) Int. Cl.
*G06Q 10/00* (2006.01)
*G06Q 20/00* (2006.01)

(52) U.S. Cl. .......................................... 705/28; 705/16
(58) Field of Classification Search ................... 705/16, 705/28
See application file for complete search history.

(56) References Cited

U.S. PATENT DOCUMENTS

| | | | |
|---|---|---|---|
| 5,774,876 A * | 6/1998 | Woolley et al. ................ 705/28 |
| 5,794,213 A * | 8/1998 | Markman ..................... 705/23 |
| 6,304,856 B1 * | 10/2001 | Soga et al. ..................... 705/28 |
| 6,456,239 B1 * | 9/2002 | Werb et al. ................... 342/463 |
| 6,496,806 B1 * | 12/2002 | Horwitz et al. ............... 705/28 |
| 6,901,304 B2 * | 5/2005 | Swan et al. .................. 700/115 |
| 2002/0185532 A1 * | 12/2002 | Berquist et al. ............. 235/385 |
| 2003/0216969 A1 * | 11/2003 | Bauer et al. .................... 705/22 |
| 2004/0004119 A1 * | 1/2004 | Baldassari et al. ........... 235/384 |
| 2004/0143505 A1 * | 7/2004 | Kovach ........................ 705/23 |
| 2005/0134436 A1 * | 6/2005 | Brookner .................. 340/14.69 |

FOREIGN PATENT DOCUMENTS

JP 2002-163301 A 6/2002

OTHER PUBLICATIONS

Shulman, Richard, RFID apps, Progressive Grocer, Dec. 1, 2002, p. 15.*

* cited by examiner

*Primary Examiner*—Matthew S Gart
*Assistant Examiner*—Scott A Zare
(74) *Attorney, Agent, or Firm*—Crowell & Moring LLP

(57) ABSTRACT

To group ID tags distributed in a larger area than the coverage of a tag reader, a parameter which represents a measure of the strength of relationship among a plurality of ID tags is stored in a parameter storage database. Values of the parameter are increased and decreased according to the number of pieces of ID information detected simultaneously in the ID tags by a mobile tag reader. A plurality of ID tags are judged as belonging to the same group according to values of the parameter stored in the parameter storage database, thereby making it possible to group ID tags distributed in a larger area than the coverage of a tag reader.

10 Claims, 3 Drawing Sheets

|  | Tag A | Tag B | Tag C | Tag D |
|---|---|---|---|---|
| Tag A |  | 10 | 9 | 0 |
| Tag B | 8 |  | 7 | 0 |
| Tag C | 6 | 9 |  | 0 |
| Tag D | 0 | 0 | 0 |  |

…

TAG GROUPING SYSTEM AND TAG GROUPING METHOD

BACKGROUND OF THE INVENTION

1. Field of the Invention

The present invention relates to a tag grouping system and tag grouping method. More particularly, it relates to a tag grouping system and tag grouping method for grouping a plurality of ID tags detected by a mobile tag reader.

2. Description of the Related Art

Conventionally, methods have been proposed for detecting a plurality of RFID (radio frequency identification) or other ID tags simultaneously by means of a mobile tag reader and grouping the tags into meaningful blocks to offer various services.

For example, a method disclosed in Patent Document 1 involves using a portable electronic device such as a cellular phone or PDA (Personal Digital Assistant) equipped with a tag reader, detecting ID tags attached to articles and the like with the mobile tag reader, grouping the tags to make it possible to recognize the articles which belong to the same user, and thereby registering belongings of the user.

(Patent Document 1)
Japanese Patent Laid-Open No. 2002-163301 (FIG. 2; Paragraphs (0040) to (0042))

However, with the conventional technique described above, the area in which the tag reader can simultaneously detect ID tags is limited. Thus, the conventional technique cannot group ID tags located in a wide area even though it can group all the ID tags detected simultaneously by the tag reader if they are located in a smaller area as is the case with a user's belongings.

For example, when it is necessary to group all the ID tags distributed in a room, conventional methods, which cannot simultaneously detect all the ID tags distributed in a large area with a tag reader, cannot group the ID tags.

If the user walk around in the room carrying a mobile tag reader, it is possible to detect all the ID tags in the room. In that case, however, it is not possible to determine whether or not the ID tags are located in the same room.

The present invention has been made to solve the above problems and has an object to provide a tag grouping system and tag grouping method which can group ID tags distributed in a larger area than the coverage of a tag reader.

SUMMARY OF THE INVENTION

Claim 1 of the present invention sets forth a tag grouping system comprising: parameter storage means for storing a parameter which represents a measure of the strength of relationship among a plurality of ID tags; parameter adjusting means for increasing and decreasing values of the parameter according to the number of pieces of ID information detected simultaneously in the ID tags by a mobile tag reader; and judging means for judging a plurality of ID tags as belonging to the same group according to values of the parameter stored in the parameter storage means. By setting a parameter which represents relationship among ID tags and adjusting the values of the parameter according to whether ID tags are detected simultaneously by a mobile tag reader, it is possible to determine the strength of relationship among the ID tags.

Claim 2 of the present invention sets forth the tag grouping system according to claim 1, wherein when ID information is detected simultaneously in a pair of ID tags for the first time, the parameter adjusting means newly sets the parameter for the pair of ID tags to indicate the measure of relationship between the pair of ID tags. If the parameter is newly set for a pair of ID tags when ID information is detected in them simultaneously by the tag reader for the first time, it is possible to indicate the strength of relationship between the ID tags by referring to the parameter.

Claim 3 of the present invention sets forth the tag grouping system according to claim 2, wherein when ID information is detected in a plurality of ID tags, the parameter adjusting means increases the appropriate values of the parameter stored in the parameter storage means. By increasing the values of the parameter for the ID tags detected simultaneously by the tag reader, it is possible to indicate that their connection is strong.

Claim 4 of the present invention sets forth the tag grouping system according to claim 2 or 3, wherein if ID information is detected only in one of a pair of ID tags which has been registered in the parameter storage means, the parameter adjusting means decreases the parameter value of the appropriate ID tag. By decreasing the appropriate parameter value when a pair of ID tags are not detected simultaneously, it is possible to indicate that their connection has weakened.

Claim 5 of the present invention sets forth the tag grouping system according to claim 2, wherein when a value of the parameter stored in the parameter storage means becomes zero, the parameter adjusting means clears the appropriate parameter setting. When a parameter value is reduced to zero, by clearing the parameter setting for the appropriate pair of ID tags, it is possible to indicate that there is no longer any connection between them.

Claim 6 of the present invention sets forth the tag grouping system according to claim 1, wherein when a value of the parameter stored in the parameter storage means exceeds a predetermined threshold, the judging means judges that the ID tags relevant to the parameter value belong to the same group. By specifying a threshold, it is possible to judge ID tags as belonging to the same group when their parameter values exceed the threshold.

Claim 7 of the present invention sets forth a tag grouping method for judging a plurality of ID tags as belonging to the same group according to values of a parameter which represents a measure of the strength of relationship among the plurality of ID tags, comprising a parameter setting step of newly setting the parameter for a pair of ID tags when ID information is detected simultaneously in the pair of ID tags for the first time. If the parameter is newly set for a pair of ID tags when ID information is detected in them simultaneously by the tag reader for the first time, it is possible to indicate the strength of relationship between the ID tags by referring to the parameter.

Incidentally, the present system is based on the following assumptions. First, it is assumed that every article in the world is tagged beforehand with an ID tag containing an identifier which identifies the article and that the tag can be read by an appropriate tag reader.

Also, although various ID tags and tag readers are available depending on the distance at which the tag reader can detect ID information (identification information) in the ID tag, the present system assumes the use of ID tags and tag readers with a relatively short detection range because the present system is intended to simultaneously detect ID information in ID tags attached to a plurality of articles. For example, it assumes the use of RFID (radio frequency identification) or the like.

Furthermore, it is assumed that the user carries a portable electronic device equipped with tag-reader capabilities for detecting ID information in ID tags. The portable electronic device is a mobile one such as a cellular phone or PDA, for example.

DETAILED DESCRIPTION OF THE PREFERRED EMBODIMENTS

Figure 1:
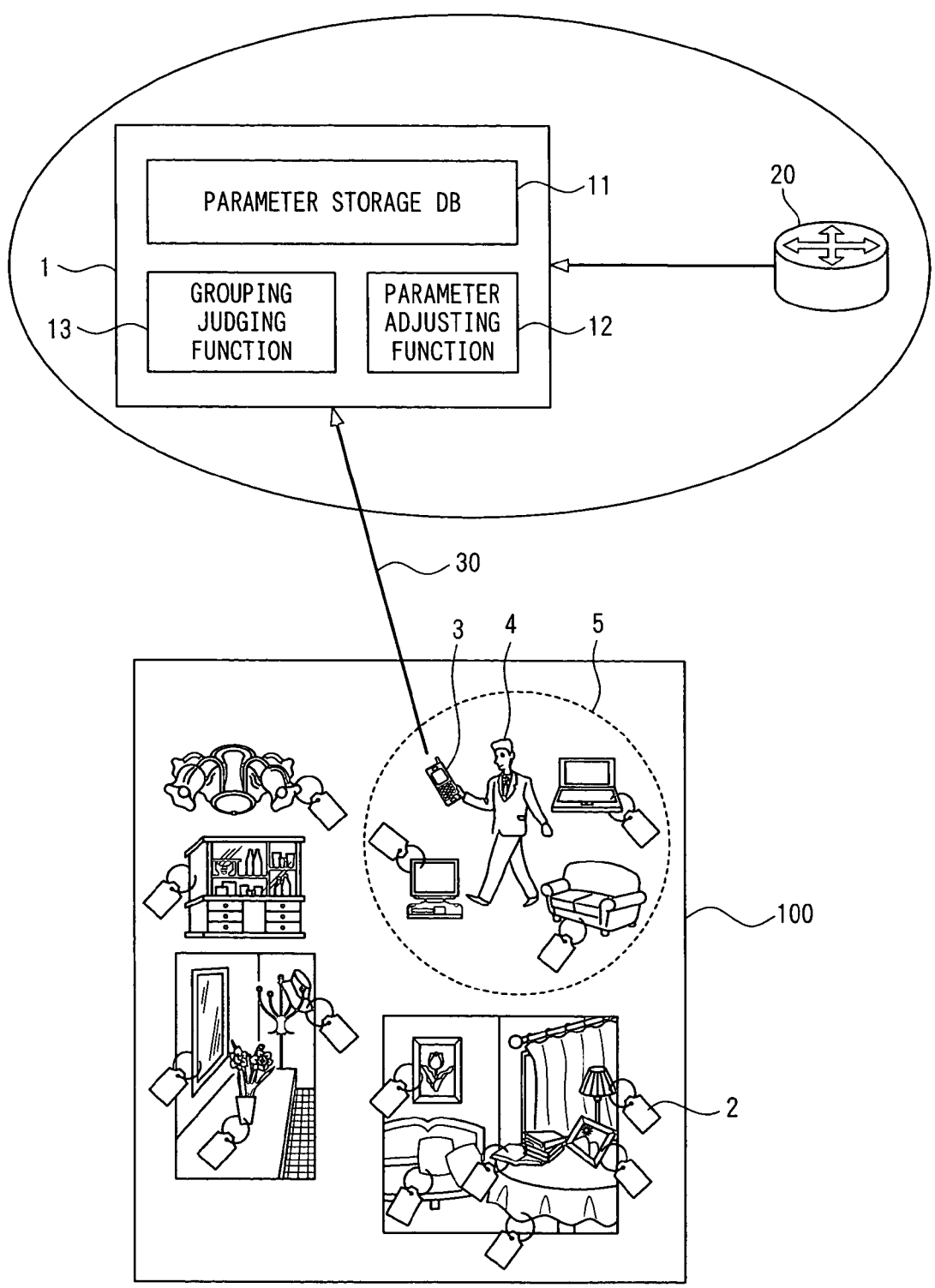
FIG. 1 is a diagram showing an embodiment of the tag grouping system according to the present invention.

An embodiment of the present invention will be described below with reference to the drawings. Regarding the drawings referred to in the following description, equivalent components in different drawings are denoted by the same reference numerals.

(Configuration of the Present System)

FIG. 1 is a block diagram showing an embodiment of the tag grouping system according to the present invention. As shown in the figure, in the tag grouping system according to this embodiment, each article in a room 100 is tagged beforehand with an ID tag 2 containing an identifier which identifies the article. ID information in the ID tag 2 is read by a portable electronic device equipped with tag-reader functions (hereinafter such a device will be referred to as a tag reader) 3.

As shown in the figure, the tag grouping system according to this embodiment includes a grouping server 1 which comprises a parameter storage DB (database) 11 for storing a parameter which represents a measure of the strength of relationship among a plurality of ID tags; a parameter adjusting function 12 for increasing and decreasing values of the parameter stored in the parameter storage DB 11 according to the number of pieces of ID information detected simultaneously in the ID tags by a mobile tag reader 3; a grouping judging function 13 for judging a plurality of ID tags as belonging to the same group according to values of the parameter stored in the parameter storage DB 11. The grouping server 1 can be implemented by a computer controlled by a program which performs operations shown later in FIGS. 3 and 4.

In the present system configured as described above, when the mobile tag reader 3 carried by a user 4 simultaneously detects ID information in ID tags within its coverage 5, it transmits the ID information and the like to the grouping server which groups ID tags. The information 30 transmitted includes, for example, the time of detection and ID information about the detecting tag reader in addition to the detected ID information about the ID tags.

The term "simultaneously" does not necessarily indicate that multiple pieces of ID information are detected at exactly the same time. Multiple pieces of ID information detected within a predetermined period of time may be regarded as having been detected simultaneously. Thus, if multiple pieces of ID information are detected within a predetermined period of time, they can be treated as ID information detected simultaneously.

The judgment as to whether multiple pieces of ID information were detected simultaneously is made by the tag reader, which then reports the result to the grouping server. Alternatively, the tag reader may report only the time of detection of ID information to the grouping server, leaving it up to the grouping server to make the judgment based on the reported detection times.

If the grouping server 1 detects ID information simultaneously in multiple ID tags for the first time, the parameter adjusting function 12 creates a table in the parameter storage DB 11, sets a parameter in the table to indicate the strength of relationship among the multiple ID tags, and increases values of the parameter to indicate that connection among the ID tags is strong.

Subsequently, if the ID tags are detected simultaneously, since the parameter which indicates the measure of relationship among the ID tags has already been set, the parameter adjusting function 12 increases the values of the parameter.

If ID information is detected only in one of a pair of ID tags though the parameter has already been set for them, the parameter adjusting function 12 decreases the value of the parameter to indicate that their connection has weakened.

When a parameter value is reduced to 0 (zero), the parameter adjusting function clears the parameter setting for the pair of ID tags to indicate that there is no longer any connection between them.

(Parameter Table)

The grouping server 1 creates parameter tables in the parameter storage DB 11 and enters parameter values in the tables.

Figures 2, 3:
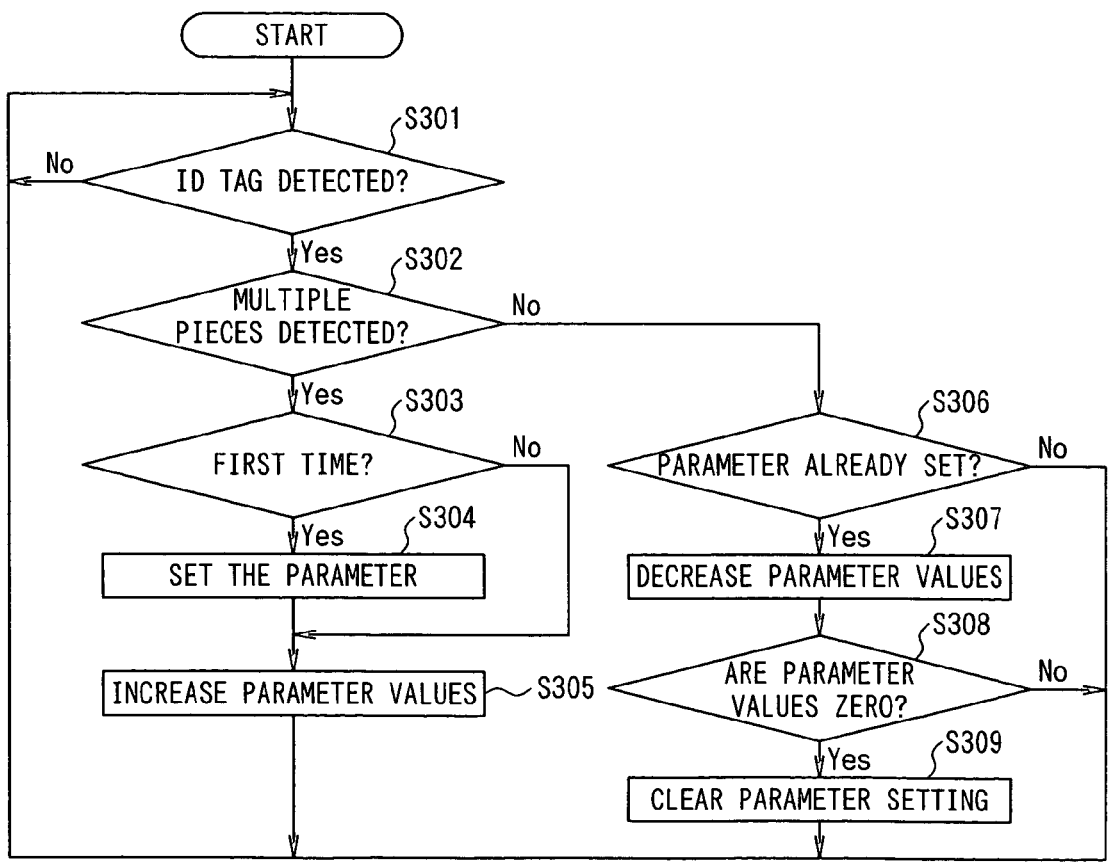
FIG. 2 is a diagram showing an example of a table created on the grouping server shown in FIG. 1.
FIG. 3 is a flowchart showing processes of the parameter adjusting function shown in FIG. 1.

The parameter tables created in the parameter storage DB 11 has a format such as the one shown in FIG. 2, for example. The table shown in FIG. 2 contains parameter settings for four tags: TagA to TagD. Parameter settings are cleared for those tags which have a parameter value of "0."

There are two parameter values for a pair of ID tags. To take tags TagA and TagB as an example, there exist two parameter values: the parameter value of TagB as viewed from TagA and the parameter value of TagA as viewed from TagB.

A parameter value increase means increasing the parameter values of both ID tags, but a parameter value decrease means decreasing only the parameter value as viewed from the detected ID tag.

Suppose the parameter has been set for tags TagA and TagB, if ID information is detected only in TagA, only the parameter value of TagB as viewed from TagA is decreased and the parameter value of TagA as viewed from TagB is left as it is without any decrease.

The grouping server 1 makes a grouping judging function 13 set a threshold for use to group ID tags. Then, if the parameter value of at least one of the pair of ID tags exceeds the threshold, the grouping judging function 13 regards the ID tags as belonging to the same group The threshold may be either set by the grouping server 1 on its own or set within the room 100 by the user 4. Alternatively, it may be set externally by a service provider 20 or the like that needs tag grouping information in order to provide services.

As the user 4 carrying the tag reader 3 walk around, for example, in the room 100, the ID tags in the room 100 can be detected by the tag reader and put into groups.

Possible application examples of tag grouping by means of such a mobile tag reader include a service for managing articles in a room by grouping all the articles located in the room and labeled with ID tags.

(Parameter Adjusting Function)

FIG. 3 is a flowchart showing processes of the parameter adjusting function 12 shown in FIG. 1.

In FIG. 3, the parameter adjusting function 12 determines first whether ID information has been detected in ID tags (Step S301). If it is found in Step S301 that no ID information has been detected in ID tags, the parameter adjusting function 12 enters a wait state.

If it is found in Step S301 that ID information has been detected in ID tags, the parameter adjusting function 12 determines whether multiple pieces of ID information have been detected (Step S301 to S302). If it is found in Step S302 that multiple pieces of ID information have been detected, the parameter adjusting function 12 further determines whether the multiple pieces of ID information have been detected for the first time (Step S302 to S303).

If it is found in Step S303 that the ID information has been detected for the first time, the parameter adjusting function 12 creates a table and newly sets the parameter (Step S303 to S304). In this case, the parameter adjusting function 12 increases the values of the parameter to indicate that the connection among the ID tags is strong (Step S304 to S305).

If it is found in Step S303 that it is not the first time that the ID information has been detected, i.e., if it is found that the ID information has been detected before, the parameter adjusting function 12 also increases the values of the parameter (Step S303 to S305). Then, the parameter adjusting function 12 returns to Step S301 and determines again whether ID information has been detected in ID tags (Step S305 to S301)

If it is found in Step S302 that a single piece of ID information has been detected rather than multiple pieces, the parameter adjusting function 12 determines whether the parameter has already been set for the ID tag (Step S302 to S306). If it is found in Step S306 that the parameter has already been set, the parameter adjusting function 12 decreases the appropriate values of the parameter to indicate that the connection between the ID tags has weakened (Step S306 to S307).

Furthermore, the parameter adjusting function 12 determines whether the parameter values are zero (Step S308). If it is found in Step S308 that parameter values are zero, the parameter adjusting function 12 clears the parameter setting for the appropriate pair of ID tags to indicate that there is no longer any connection between them (Step S308 to S309).

If it is found in Step S306 that the parameter has not been set, the parameter adjusting function 12 returns to Step S301 and determines again whether ID information has been detected in ID tags (Step S306 to S301).

If it is found in Step S308 that the parameter values are not zero, the parameter adjusting function 12 also returns to Step S301 and determines again whether ID information has been detected in ID tags (Step S308 to S301). If the parameter setting is cleared in Step S309, the parameter adjusting function 12 also returns to Step S301 and determines again whether ID information has been detected in ID tags (Step S309 to S301).

By repeating the above processes, the parameter adjusting function 12 increases or decreases parameter values according to the number of pieces of ID information detected in ID tags.

(Grouping Judging Function)

Figure 4:
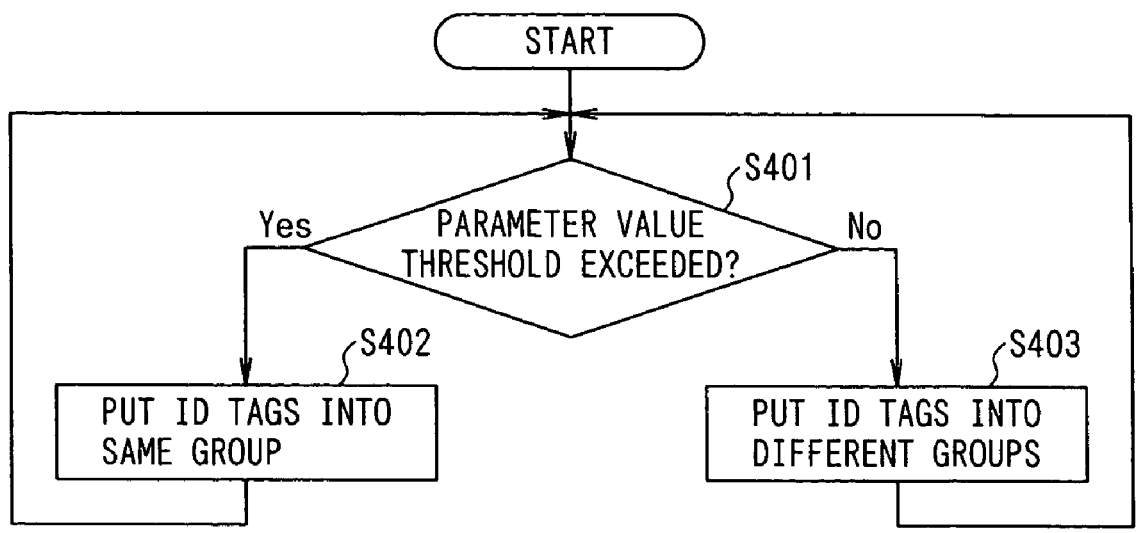
FIG. 4 is a flowchart showing processes of the grouping judging function shown in FIG. 1.

FIG. 4 is a flowchart showing processes of the grouping judging function 13 shown in FIG. 1.

In FIG. 4, the grouping judging function 13 determines first whether parameter values exceed a predetermined threshold (Step S401). If it is found in Step S401 that a parameter value exceeds the predetermined threshold, the grouping judging function 13 puts the relevant pair of ID tags into the same group (Step S401 to S402). If it is found in Step S401 that neither parameter value exceeds the predetermined threshold, the grouping judging function 13 puts the two relevant ID tags into different groups (Step S401 to S403).

By repeating the above processes, the grouping judging function 13 puts ID tags into groups.

By moving a tag reader, the tag grouping system described above can detect and group ID information in multiple ID tags distributed over such a wide area in which a single reader cannot detect all of them conventionally. The system is expected to help create new services because it can provide the information to content providers that provide grouped information to users and service providers that need grouping information in order to provide services.

(Tag Grouping Method)

Implemented in the tag grouping system described above is a tag grouping method for judging a plurality of ID tags as belonging to the same group according to values of a parameter which represents a measure of the strength of relationship among the plurality of ID tags, comprising a parameter setting step of newly setting the parameter for a pair of ID tags when ID information is detected simultaneously in the pair of ID tags for the first time (this step corresponds to Step S304 in FIG. 3). If the parameter is newly set for a pair of ID tags detected simultaneously by the tag reader for the first time, it is possible to indicate the strength of relationship between the ID tags by referring to the parameter.

Also implemented is the tag grouping method, further comprising a parameter increasing step of increasing the values of the parameter when ID information is detected in the plurality of ID tags (this step corresponds to Step S305 in FIG. 3). By increasing the values of the parameter for the ID tags detected simultaneously by the tag reader, it is possible to indicate that their connection is strong.

Also implemented is the tag grouping method, further comprising a parameter decreasing step of decreasing the appropriate parameter value if ID information is detected only in one of a pair of ID tags for which the parameter has been set (this step corresponds to Step S307 in FIG. 3). By decreasing the appropriate parameter value when a pair of ID tags are not detected simultaneously, it is possible to indicate that their connection has weakened.

Also implemented is the tag grouping method, further comprising a parameter clearing step of clearing the appropriate parameter setting when a value of the parameter stored in the parameter storage means becomes zero (this step corresponds to Step S309 in FIG. 3). When a parameter value is reduced to zero, by clearing the parameter setting for the appropriate pair of ID tags, it is possible to indicate that there is no longer any connection between them.

Also implemented is the tag grouping method, further comprising a judging step of judging that the ID tags whose parameter values exceed a predetermined threshold as belonging to the same group. By specifying a threshold, it is possible to judge ID tags as belonging to the same group when their parameter values exceed the threshold.

As described above, the present invention can group a plurality of ID tags distributed in a larger area than the coverage of a tag reader by storing a parameter which represents a measure of the strength of relationship among a plurality of ID tags, increasing and decreasing values of the parameter according to the number of pieces of ID information detected simultaneously in the ID tags by a mobile tag reader, and judging ID tags as belonging to the same group according to values of the parameter. The present invention is expected to help create new services because it can provide the information to content providers that provide grouped information to users and service providers that need grouping information in order to provide services.

What is claimed is:

1. A tag grouping system, comprising:
    parameter storage means for storing a parameter which represents a measure of a strength of relationship among a plurality of ID tags;
    parameter adjusting means for increasing and decreasing values of the parameter according to a number of pieces of ID information detected simultaneously in the plurality of ID tags by a mobile tag reader; and
    judging means for judging the plurality of ID tags as belonging to a same group according to values of the parameter stored in the parameter storage means;
    wherein when ID information is first detected simultaneously in a pair of ID tags, the parameter adjusting means newly sets the parameter for the pair or ID tags to indicate the measure of the strength of relationship between the pair of ID tags, and when ID information is subsequently detected simultaneously in the pair of ID tags, the parameter adjusting means increases the value of the parameter stored in the parameter storage means.

2. The tag grouping system according to claim 1, wherein when ID information is detected in the plurality of ID tags, the parameter adjusting means increases the values of the parameter stored in the parameter storage means.

3. The tag grouping system according to claim 1, wherein if ID information is detected only in one ID tag of the pair of ID tags which has been registered in the parameter storage means, the parameter adjusting means decreases the parameter value of one of the ID tags of the pair of ID tags.

4. The tag grouping system according to claim 1, wherein when a value of the parameter stored in the parameter storage means becomes zero, the parameter adjusting means clears a parameter setting.

5. The tag grouping system according to claim 1, wherein when a value of the parameter stored in the parameter storage means exceeds a predetermined threshold, the judging means judges that the plurality of ID tags relevant to the parameter value belong to the same group.

6. A method of tag grouping, comprising:
    storing in a parameter storage medium a parameter which represents a measure of a strength of relationship among a plurality of ID tags;
    increasing and decreasing values of the parameter according to a number of pieces of ID information detected simultaneously in the plurality of ID tags by a mobile tag reader;
    judging the plurality of ID tags as belonging to a same group according to values of the parameter stored in the parameter storage medium;
    when ID information is first detected simultaneously in a pair of ID tags, newly setting the parameter for the pair of ID tags to indicate the measure of the strength of relationship between the pair of ID tags; and
    when ID information is subsequently detected simultaneously in the pair of ID tags, increasing the value of the parameter stored in the parameter storage medium.

7. The method of tag grouping according to claim 6, wherein when ID information is detected in the plurality of ID tags, increasing the values of the parameter stored in the parameter storage medium.

8. The method of tag grouping according to claim 6, wherein if ID information is detected only in one ID tag of the pair of ID tags which has been registered in the parameter storage medium, the parameter value of one of the ID tags of the pair of ID tags is decreased.

9. The method of tag grouping according to claim 6, wherein when a value of the parameter stored in the parameter storage medium becomes zero, a parameter setting in the parameter adjusting medium is cleared.

10. The method of tag grouping according to claim 6, wherein when a value of the parameter stored in the parameter storage medium exceeds a predetermined threshold, the plurality of ID tags are judged to be relevant to the parameter value belonging to the same group.

* * * * *

UNITED STATES PATENT AND TRADEMARK OFFICE
CERTIFICATE OF CORRECTION

PATENT NO.        : 7,603,298 B2
APPLICATION NO. : 10/775129
DATED             : October 13, 2009
INVENTOR(S)       : Sakamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1412 days.

Signed and Sealed this

Fifth Day of October, 2010

David J. Kappos
*Director of the United States Patent and Trademark Office*